No. 739,756. PATENTED SEPT. 22, 1903.
A. RAINESS.
DEVICE FOR SECURING PINS.
APPLICATION FILED MAR. 23, 1903.
NO MODEL.
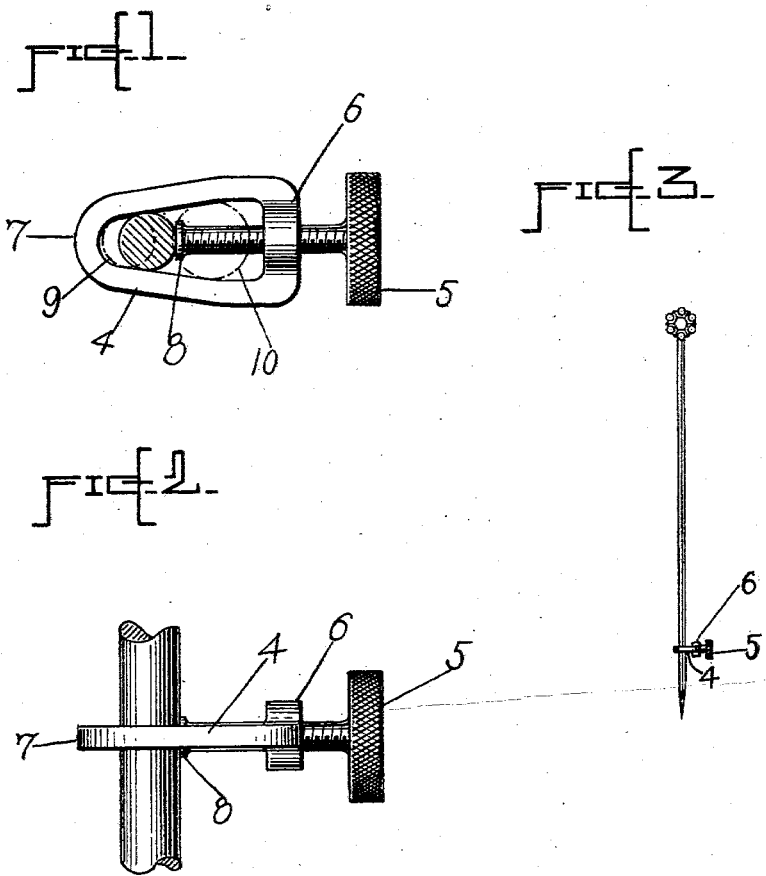
Witnesses:
Samuel Bachman.
Newton Harrison
Inventor
Abraham Rainess
By Otto Greenberg
Attorney No. 739,756. Patented September 22, 1903.

UNITED STATES PATENT OFFICE.

ABRAHAM RAINESS, OF NEW YORK, N. Y.

DEVICE FOR SECURING PINS.

SPECIFICATION forming part of Letters Patent No. 739,756, dated September 22, 1903.

Application filed March 23, 1903. Serial No. 149,225. (No model.)

*To all whom it may concern:*

Be it known that I, ABRAHAM RAINESS, a subject of the Czar of Russia, and a resident of the city of New York, State of New York, have invented certain new and useful Improvements in Devices for Securing Pins, of which the following is a specification.

This invention relates to devices for securing stick-pins, brooches, belt-pins, and the like against accidental or other undesired removal from the fabric in which they are to be inserted. It belongs to that class of devices wherein the mechanism for securing against accidental removal is separate and distinct from the pin and is attached to the shank of the pin near the point thereof after the said shank has been inserted and passed through the fabric.

The objects of this invention are to provide a device that can be applied to pins having shanks of various thicknesses, that will more firmly grip the shank than devices hitherto used, and that will not work itself loose when once gripped.

The drawings forming a part of this specification illustrate the invention and the means for accomplishing the objects above mentioned.

Figure 1 is a plan of the device, very much enlarged, showing it clamped to a shank in section; Fig. 2, a side view of Fig. 1; Fig. 3, the device gripped to a stick-pin, showing its place of application on the pin with respect to the point of the said pin.

The device forming the subject of this invention consists of two parts, a wedge-shaped yoke 4 and a thumb-screw 5, working through a threaded hole in the base 6 of the wedge-shaped yoke 4 and into the hollow thereof in a line toward the point 7 of the wedge. The end 8 of the thumb-screw 5 may be enlarged to guard against its loss by removal from the yoke.

To prevent the accidental removal of a stick-pin or the like from the fabric in which it may have been inserted, the yoke 4 is slipped on the shank of the pin from the free or point end thereof and is then tightened to the shank by means of the thumb-screw 5.
By reason of the wedge-shaped form of the yoke the device is applicable to shanks of various thickness, providing similar points of contact for all diameters, as shown in broken lines at 9 and 10, Fig. 1. Furthermore, upon the application of pressure by means of the thumb-screw the shank of the pin is not merely clamped thereby, but is wedged between the converging sides of the yoke, giving a firmer grip to the device than could be obtained hitherto, and this without scratching or cutting the pin. Upon wedging the shank the converging sides of the yoke will give slightly, and thus furnish a resilient pressure on the shank and indirectly on the end of the thumb-screw. By reason of this constant pressure on the thumb-screw and in turn on the thread thereof the thumb-screw is prevented from working itself loose.

Having fully described my invention and the mode of its application, what I claim is—

1. A device for securing a pin in fabric, consisting of a wedge-shaped yoke provided with a thumb-screw passing through a threaded hole in the base of the said wedge-shaped yoke and into the hollow of said yoke, for the purposes as set forth and substantially as described.

2. A device for securing a pin in fabric, consisting of a yoke, the hollow whereof is wedge-shaped, and a thumb-screw engaging a threaded hole in the yoke at the base of the wedge, the end whereof may be screwed into the said hollow, for the purposes as set forth and substantially as described.

3. A device for securing a pin in fabric, consisting of a wedge-shaped yoke provided with a thumb-screw passing through a threaded hole in the base of the said wedge-shaped yoke and into the hollow of the said yoke, and having an enlarged end to prevent its removal from the said yoke, for the purposes as set forth and substantially as described.

Signed at New York, N. Y., this    day of February, 1903.

ABRAHAM RAINESS.

Witnesses:
　OTTO GREENBERG,
　MORTIMER E. JOINER.